(12) United States Patent
Gutsmann et al.

(10) Patent No.: US 12,520,835 B2
(45) Date of Patent: Jan. 13, 2026

(54) MONITORING MODULE FOR SPRAYERS

(71) Applicant: Bayer Aktiengesellschaft, Leverkusen (DE)

(72) Inventors: Volker Gutsmann, Langenfeld (DE); Walter Mayer, Wuppertal (DE)

(73) Assignee: Bayer Aktiengesellschaft, Leverkusen (DE)

( * ) Notice: Subject to any disclaimer, the term of this patent is extended or adjusted under 35 U.S.C. 154(b) by 637 days.

(21) Appl. No.: 17/615,549

(22) PCT Filed: May 25, 2020

(86) PCT No.: PCT/EP2020/064382
§ 371 (c)(1),
(2) Date: Nov. 30, 2021

(87) PCT Pub. No.: WO2020/239664
PCT Pub. Date: Dec. 3, 2020

(65) Prior Publication Data
US 2022/0232815 A1    Jul. 28, 2022

(30) Foreign Application Priority Data

May 31, 2019  (EP) .................................... 19177562
Dec. 17, 2019 (EP) .................................... 19217003

(51) Int. Cl.
*A01M 7/00*   (2006.01)
*A01C 23/00*  (2006.01)

(52) U.S. Cl.
CPC ......... *A01M 7/0089* (2013.01); *A01C 23/007* (2013.01); *A01M 7/0032* (2013.01)

(58) Field of Classification Search
CPC .............. A01M 7/0089; A01M 7/0032; A01M 7/0017; A01M 7/0046; A01C 23/007; B05B 12/006; B05B 9/08; B05B 9/0888
See application file for complete search history.

(56) References Cited

U.S. PATENT DOCUMENTS 4,126,335 A   11/1978 Voss
4,556,241 A   12/1985 Weinhold
(Continued)

FOREIGN PATENT DOCUMENTS

DE   2523338 A1   5/1975
DE   3218965 A1   11/1983
(Continued)

OTHER PUBLICATIONS

Bonfig, Karl Walter (2002). "Technical Flow Measurement with particular consideration of new flow measurement methods," Jan. 1, 2002, Vulkan Publishing House, Essen, ISBN 3-8027-2190-X, 6 pages of machine translation.
(Continued)

*Primary Examiner* — Joseph A Greenlund
(74) *Attorney, Agent, or Firm* — E. Eric Mills; Nicholas P. Stadnyk; Maynard Nexsen PC

(57) ABSTRACT

The present invention relates to the application of plant protection agents, fertilisers and/or pesticides by means of a (preferably portable) sprayer or a small appliance (such as, for example, a bicycle tyre sealant injector). The present invention relates to a monitoring module with which existing sprayers can be equipped in order to control, track and/or document the spraying process. The present invention further relates to a method, a system and a computer program product for monitoring spraying processes.

11 Claims, 8 Drawing Sheets

(56) References Cited

U.S. PATENT DOCUMENTS

| | | | | |
|---|---|---|---|---|
| 4,790,454 | A * | 12/1988 | Clark | B01F 25/62 |
| | | | | 222/145.8 |
| 5,147,412 | A * | 9/1992 | Klinksiek | B01F 25/3121 |
| | | | | 585/812 |
| 10,940,497 | B2 * | 3/2021 | Gutsmann | B05B 12/1436 |
| 11,059,063 | B2 * | 7/2021 | Gutsmann | A01M 25/006 |
| 11,925,949 | B1 * | 3/2024 | Craig | G01F 1/115 |
| 11,964,291 | B2 * | 4/2024 | Azer | F04B 23/02 |
| 2005/0006400 | A1 | 1/2005 | Shapanus et al. | |
| 2005/0121462 | A1 * | 6/2005 | Allen | B05B 12/00 |
| | | | | 222/31 |
| 2006/0102245 | A1 * | 5/2006 | Kaechle | B05B 9/0833 |
| | | | | 239/526 |
| 2006/0249223 | A1 | 11/2006 | Leer et al. | |
| 2006/0261181 | A1 | 11/2006 | Wirz | |
| 2013/0037625 | A1 * | 2/2013 | Arenson | A01M 7/0089 |
| | | | | 239/71 |
| 2015/0296764 | A1 * | 10/2015 | Wirz Luchsinger | |
| | | | | A01M 7/0046 |
| | | | | 239/120 |
| 2016/0044862 | A1 * | 2/2016 | Kocer | A01M 7/0089 |
| | | | | 111/118 |
| 2016/0368011 | A1 * | 12/2016 | Feldhaus | B05B 12/124 |
| 2017/0129605 | A1 * | 5/2017 | Wu | B05B 12/02 |
| 2018/0274212 | A1 | 9/2018 | Kuchly | |
| 2018/0348030 | A1 * | 12/2018 | Chen | G01F 1/6847 |
| 2019/0000065 | A1 * | 1/2019 | Gutsmann | B05B 12/1436 |
| 2019/0000066 | A1 * | 1/2019 | Gutsmann | B05B 9/0861 |
| 2019/0060928 | A1 | 2/2019 | Gutsmann et al. | |
| 2019/0217319 | A1 * | 7/2019 | Harvey | B05B 12/16 |
| 2019/0329018 | A1 * | 10/2019 | Glaser | A61M 39/12 |
| 2019/0351438 | A1 * | 11/2019 | Mayer | B05B 9/0877 |
| 2019/0388923 | A1 * | 12/2019 | Giacalone | B05B 12/00 |
| 2020/0001313 | A1 * | 1/2020 | Bindl | B05B 12/006 |
| 2020/0116535 | A1 * | 4/2020 | Craig | G01S 5/0027 |
| 2020/0124216 | A1 | 4/2020 | Beurer et al. | |
| 2021/0386050 | A1 * | 12/2021 | Garmendia Oyarbide | |
| | | | | A01M 7/0089 |
| 2022/0016654 | A1 * | 1/2022 | Broghammer | B05B 15/72 |
| 2022/0232815 | A1 * | 7/2022 | Gutsmann | A01M 7/0039 |
| 2024/0099288 | A1 * | 3/2024 | Maurer | B05B 12/06 |

FOREIGN PATENT DOCUMENTS

| | | |
|---|---|---|
| DE | 3617199 A1 | 11/1987 |
| DE | 4139742 A1 | 6/1993 |
| DE | 4211498 A1 | 10/1993 |
| DE | 9319397 U1 | 3/1994 |
| DE | 19818085 A1 | 10/1999 |
| DE | 102005013662 A1 | 9/2006 |
| DE | 102013109785 A1 | 3/2015 |
| DE | 102017000008 A1 | 7/2018 |
| DE | 102017004353 A1 | 11/2018 |
| EP | 0143588 A2 | 6/1985 |
| EP | 0256744 A1 | 2/1988 |
| EP | 3348329 A1 | 7/2018 |
| GB | 8511911 | 6/1985 |
| JP | 07256159 A | 10/1995 |
| SE | 7611659 L | 4/1977 |
| WO | 2013165684 A2 | 11/2013 |
| WO | 2015087805 A1 | 6/2015 |
| WO | 2018011009 A1 | 1/2018 |
| WO | 2018011010 A1 | 1/2018 |
| WO | 2018011011 A1 | 1/2018 |
| WO | 2018011012 A1 | 1/2018 |
| WO | 2018108696 A1 | 6/2018 |

OTHER PUBLICATIONS

Endress+Hauser (2017). "Picomag: The simple and smart plug-and-play meter for utilities," Feb. 28, 2017, XP093166663, 4 pages.

Extended European Search Report for European Application No. 24175381.3, mailed on Aug. 22, 2024, 37 pages of machine translation.

Sonotec (Oct. 26, 2018). "Sonoflow IL.52 V2.0 Ultrasonic Flow Sensor," Technical Data Sheet Revision 1.1, pp. 1-6.

* cited by examiner

MONITORING MODULE FOR SPRAYERS

CROSS REFERENCE TO RELATED APPLICATIONS

This application is a national stage application under 35 U.S.C § 371 of International Application No. PCT/EP2020/064382, filed internationally on May 25, 2020, which claims benefit of European Application Nos. 19177562.6, filed May 31, 2019 and 19217003.3, filed Dec. 17, 2019.

FIELD OF THE INVENTION

The present disclosure is concerned with the application of crop protection compositions, fertilizers and/or pesticides with the aid of a (preferably portable) sprayer or a small device (such as a bicycle syringe). One subject of the present invention is a monitoring module with which existing sprayers can be equipped in order to check, track and/or document the spraying process. Further subjects are a method, a system, and a computer program product for monitoring spraying processes.

BACKGROUND OF THE INVENTION

Sprayers are described extensively in the prior art. Sprayers are used in agriculture to apply crop protection compositions or fertilizers (see e.g. WO2018/108696A1, DE102013109785A1, EP0143588A2, EP0256744A1). Likewise, sprayers are used in forestry (see e.g. US20050121462A1) or in pest control (see e.g. WO2018011009A1, WO2018011010A1, WO2018011011A1, WO2018011012A1, US2005/0006400A1, US2006/0102245A1, US20060249223A1, US2006/0261181A1, WO2013/165684A2, WO2015/087805A1, U.S. Pat. No. 4,790,454).

Often, relatively simple devices having a portable container for holding the spray composition and a nozzle holder with at least one nozzle via which the spray composition can be distributed are used. Depending on the application, a hand-held spraying device can also be equipped with multiple nozzles by way of a small bar. A hand-operated or motor-operated pump is used to convey the spray composition from the container, through spray composition lines to the nozzle holder, and through the at least one nozzle onto one or more target objects while the user walks through the target area. The application rate is dependent on the walking speed, the spraying width and the quantity of spray composition conveyed per unit time. Since the specified application parameters usually vary during an application process (humans are not machines), the application rate is uneven over the target area. This can result in too little or too much spray composition being applied. An excessively small application rate can cause the spray composition to be ineffective. An excessively large quantity can result in unnecessary costs or even damage.

The spray composition is usually composed of a carrier liquid (water) and one or more active substances (e.g. a herbicide, fungicide, or pesticide) and/or nutrients. Before application, the spray composition must first be produced by diluting (e.g.) a concentrate with a carrier liquid (water). In this context, the correct degree of dilution must be found in order to achieve a defined application rate of active substance/nutrients per unit area. In this context, the degree of dilution to be set depends on the spraying width and on the walking speed of the person carrying out the spraying process. The correct degree of dilution therefore depends on which nozzle(s) is/are used, at what height the nozzle(s) is/are guided over the target area, how much spray composition exits the nozzle(s) per unit time and how fast the person moves through the target area.

WO2018/108696A1 discloses a portable sprayer comprising a flow meter, a distance sensor and a signal transmitter. The sprayer is configured in such a way that it interacts with a mobile computer (e.g. a smartphone). The walking speed of the user of the portable sprayer can be determined using a GPS sensor and a timer of the mobile computer. The application rate which is output per unit time can be determined using the flow meter. The spraying width is determined in a preceding calibration process. The distance sensor and the signal transmitter can be used to ensure a constant distance between the nozzle holder of the sprayer and the target objects and thus—for a constant distance—to guarantee a constant spray width: if the distance is too great or too small, the user is informed via the signal transmitter about the too great or too small a distance in order to correct the distance accordingly so that the spray width remains constant. WO2018/108696A1 therefore discloses solutions to the problems described above. However, in order to be able to make use of the solutions a user must acquire a new, correspondingly equipped sprayer. It would be advantageous to also be able to use the solutions described in WO2018/108696A1 with a sprayer which is already available.

This is made possible by the present invention.

SUMMARY OF THE INVENTION

A first embodiment of the present disclosure is a monitoring module for equipping a preferably portable sprayer with functions for monitoring a spraying process, wherein the monitoring module comprises:
- a first connecting element and a second connecting element for integrating the monitoring module into a line of the sprayer between a container for spray composition and at least one nozzle, wherein the first connecting element is embodied in such a way that it can be connected to a part of the line of the sprayer which is directed upstream, the second connecting element being embodied in such a way that it can be connected to a part of the line of the sprayer which is directed downstream,
- a flow chamber between the first connecting element and the second connecting element,
- a flow meter for measuring a quantity of spraying medium which flows through the flow chamber per unit of time,
- a control,
- a, and
- an energy supply for supplying the flow meter, the control and the with electrical energy, wherein the control is configured to receive measured values from the flow meter and to cause the to transmit data about the quantity of the spray composition which flows through the flow chamber per unit time to a computer system.

In some embodiments of the present disclosure, a system is provided, the system comprising:
a monitoring module, and
a computer system,
    wherein the monitoring module comprises:
        a first connecting element and a second connecting element for integrating the monitoring module into a line of a sprayer between a container for spray composition and at least one nozzle, wherein the first connecting element is embodied in such a way that it can be connected to a part of the line of the sprayer which is directed upstream, the second connecting element being embodied in such a way that it can be connected to a part of the line of the sprayer which is directed downstream, a flow chamber between the first connecting element and the second connecting element, a flow meter for measuring a quantity of a spray composition flowing through the flow chamber per unit time, a control, a, and an energy supply for supplying the flow meter, the control and the with electrical energy, wherein the control of the monitoring module is configured to receive measured values from the flow meter and to cause the to transmit data about the quantity of the spray composition which flows through the flow chamber per unit time to the computer system, and wherein the computer system is configured to receive the data from the monitoring module and to display said data to a user.

In some embodiments of the present disclosure, a method comprising the following steps is provided:

equipping a preferably portable sprayer with a monitoring module, characterized in that the monitoring module is integrated into a line between a container for spray composition and at least one nozzle of the portable sprayer, so that spray composition which flows from the container to the at least one nozzle flows through a flow chamber of the monitoring module, sensing a route which the sprayer covers during a period of time, sensing the quantities of spray composition which flow through the flow chamber along the route, transmitting data about the route covered and about the quantities of spray composition to a computer system via a network, and displaying the route and information about the quantities of spray composition which have been applied along the route to a user.

In some embodiments of the present disclosure, a computer program product is provided which can be loaded into the main memory of a computer system and which causes the computer system to perform the following steps:

receiving or determining a spray width, receiving and/or determining information about an active substance, sensing a route of a user during a defined period of time, determining speeds of the user along the route, sensing quantities of spray composition which are discharged per unit time along the route by the user, determining application rates of the active substance per unit area along the route on the basis of the speeds of the user, the discharged quantities of spray composition and the information about the active substance, displaying the route and the application rates of the active substance per unit area along the route.

The invention is explained in more detail below without distinguishing between the subjects of the invention (monitoring module, system, method, computer program product). The explanations that follow shall instead apply analogously to all subjects of the invention, regardless of the context (monitoring module, system, method, computer program product) in which they are provided.

If the description of a method according to the invention or of a computer program product involves steps being specified in a sequence, this does not necessarily mean that the steps also have to be performed in the indicated sequence. The invention should instead be understood as meaning that the steps which are specified in a sequence can be performed in any desired sequence or even in parallel with one another unless one step is based on another step, which becomes clear from the description of each of the steps. The specified sequences constitute preferred embodiments of the invention.

The monitoring module according to the present disclosure may be used to track and/or monitor (check) and/or document a spraying process by means of a sprayer, the spraying process being carried out by a human user. A spraying process describes the application of one or more spray compositions to one or more target objects in a target area.

In some embodiments, the monitoring module may be a separate device that is independent of a sprayer.

In some embodiments, the monitoring module according to the present disclosure can be understood as a retrofit kit for existing (preferably portable) sprayers which can be used to equip the existing sprayers with extended functionalities in order to check, track and/or document spraying processes. Synonymous terms for the term "monitoring module" are, for example, monitoring, monitoring device, spray composition application check module and/or the like.

The term "sprayer(s)" includes sprayers that can be transported on the back and/or in the hand of a human user; however, the term is not limited to such sprayers. Sprayers that can be moved, for example, with mechanical aids (for example bicycle syringes) are also intended to be encompassed by the term "sprayer(s)". The sprayer into which the monitoring module according to the invention can be integrated is preferably a portable sprayer. The term "portable" here means that the sprayer can be transported by an adult who is usually charged with the performance of spraying tasks over a distance of e.g. more than 100 meters without electrical and/or motor-operated aids. Examples of portable sprayers are disclosed in: WO2018/108696A1, DE102013109785A1, EP0143588A2, EP0256744A1, US20050121462A1, WO2018011009A1, WO2018011010A1, WO2018011011A1, WO2018011012A1, US2005/0006400A1, US2006/0102245A1, US20060249223A1, US2006/0261181A1, WO2013/165684A2, WO2015/087805A1 and U.S. Pat. No. 4,790,454.

In some embodiments, the monitoring module according to the present disclosure may be designed for easy integration into a large number of sprayers. Sprayers usually comprise a container in which the spray composition which is to be discharged is located. Furthermore, they may comprise at least one nozzle via which the spray composition leaves the sprayer during a spraying process. The at least one nozzle usually converts the spraying composition passing through it into droplets with a specific droplet size distribution which depends, inter alia, on the pressure upstream of the nozzle, on the flow rate of the spraying composition and on the design of the nozzle.

In some embodiments, the monitoring module according to the present disclosure may be introduced into a line of a sprayer between the container of the sprayer and the at least one nozzle of the sprayer. The container and the at least one nozzle have a fluid connection via the line between the container and the at least one nozzle. The monitoring module is integrated into this fluid connection, the fluid connection between the container and the at least one nozzle being maintained (after integration).

In some embodiments, for integration into a line, the monitoring module may have two connecting elements, a first connecting element and a second connecting element.

In some embodiments, the first connecting element is used to connect the monitoring module to that part of the line which is directed upstream. This is to be understood as being that part of the line which leads to the container. Spray composition which flows out of the container in the direction of the at least one nozzle flows through this part of the line and from there reaches the monitoring module.

In some embodiments, the second connecting element is used to connect the monitoring module to that part of the line which is directed downstream. This is to be understood as that part of the line which leads to the at least one nozzle. Spray composition which flows out of the container in the direction of the at least one nozzle flows first through the monitoring module and then through this part of the line to the at least one nozzle.

In some embodiments, the connecting elements can be embodied, for example, as hose connectors. The line between the container and the at least one nozzle of a sprayer is often embodied as a flexible hose. It is conceivable to cut the hose at one point and to pull the two resulting hose ends (hose openings) over the two hose connectors of the monitoring module, wherein one hose connector performs the function of the first connecting element and is connected to the hose end via which the container is reached (upstream), and the other hose connector performs the function of the second connecting element via which the at least one nozzle is reached (downstream). Hose clamps can be used to additionally fix the hose ends to the connectors.

Further numerous possible examples of connecting elements are disclosed in the prior art (see e.g. DE102017000008, DE19818085, DE102017004353, SE7611659, DE4139742, DE2523338, DE3218965, DE4211498, GB8511911, DE3617199, DE9319397).

In some embodiments, the monitoring module according to the present disclosure comprises a flow chamber. It is located between the two connecting elements. The monitoring module introduced into a line of a sprayer forces the spray composition flowing from the container of the sprayer in the direction of the at least one nozzle of the sprayer to flow through the flow chamber.

In some embodiments, a flow meter is located in the flow chamber. This flow meter may be used to register the quantity of spray composition flowing through the flow chamber per unit time. The term quantity is understood to mean the volume or the mass, depending on the measurement method used.

In some embodiments, the flow meter may be an impeller sensor, a magnetically inductive flow meter, a variable area flow meter, an ultrasonic flow meter, a Coriolis mass flow meter, a calorimetric flow meter or a vortex flow meter. However, it is also conceivable to use a measuring orifice or a dynamic pressure probe. Details on the flow measurement can be found, for example, in the following manual: K. W. Bonfig: *Technische Durchflussmessung* [Technical flow measurement], Vulkan-Verlag Essen, 3rd edition, 2002, ISBN 3-8027-2190-X.

In some embodiments, an impeller sensor is used to measure the flow. The measuring principle is based on the fact that an impeller assumes a rotational speed in proportion to the flow rate of a fluid by which the impeller is driven. To measure the speed, a permanent magnet can be attached to the impeller, which magnet moves with the impeller. A Hall sensor past which the permanent magnet moves can be used as a pulse counter. The number of pulses measured per unit time is proportional to the rotational speed of the impeller and therefore to the flow rate of the fluid.

In some embodiments, the monitoring module further comprises a controller, a and an energy supply. In some embodiments, the controller is used to control the electrical/electronic components of the monitoring module, in particular to control the acquisition of the measured values, if appropriate the storage of measurement data, if appropriate the performance of calculations and the sending of data to a computer system using the unit. The controller usually comprises a processor, a program memory and a main memory. The controller can also comprise a nonvolatile data memory which is preferably embodied as a semiconductor memory and which can be used, for example, to store measured values and/or results of calculations.

In some embodiments, the energy supply may be used to supply the flow meter, the controller, the and, if necessary, further electrically driven components of the monitoring module with electrical energy. The energy supply may be, for example, an electrochemical cell (battery) or a rechargeable accumulator.

In some embodiments, the may be used to transmit data from the monitoring module to a separate computer system. Data are preferably transmitted via a short-range radio connection such as, for example, Bluetooth, Zigbee, Z-Wave, EnOcean and/or the like, particularly preferably via Bluetooth LE (Low Energy).

In some embodiments, the monitoring module comprises
  a housing,
  a first connecting element attached to the housing,
  a second connecting element attached to the housing,
  a flow chamber in the housing between the first connecting element and the second connecting element,
  a flow meter in the flow chamber for measuring a quantity of spray composition which flows through the flow chamber per unit time,
  a transmitter in the housing outside the flow chamber,
  a controller in the housing outside the flow chamber, wherein the control is configured to receive measured values from the flow meter and to cause the transmitter to transmit data about the quantity of the spray composition which flows through the flow chamber per unit time to a computer system, and
  an energy supply in the housing outside the flow chamber for supplying the flow meter, the controller and the transmitter with electrical energy.

In some embodiments, the housing preferably has means for fastening the housing to a sprayer. It is conceivable that there are multiple housings. The housings can be nested within one another or they can be separate from one another. For example, there can be a (separate) housing for the energy supply, for the controller and/or the.

In some embodiments, a method for equipping a preferably portable sprayer with a monitoring module is provided, the method comprising the following steps:
  providing a monitoring module, wherein the monitoring module comprises:
    a first connecting element,
    a second connecting element,
    a flow chamber between the first connecting element and the second connecting element,
    a flow meter for measuring a quantity of spray composition which flows through the flow chamber per unit time,
    a transmitter,
    a controller, wherein the controller is configured to receive measured values from the flow meter and to cause the transmitter to transmit data about the quantity of spray composition which flows through the flow chamber per unit time to a computer system, an energy supply for supplying the flow meter, the controller and the transmitter with electrical energy, providing a preferably portable sprayer, wherein the sprayer comprises:

a container for holding spray composition at least one nozzle, and a line between the container and the at least one nozzle, integrating the monitoring module into the line between the container and the at least one nozzle.

The step "integrating the monitoring module into the line between the container and the at least one nozzle" causes spray composition which flows from the container to the at least one nozzle to flow through the flow chamber of the monitoring module.

The step "integrating the monitoring module into the line between the container and the at least one nozzle" can comprise the following partial steps:

severing the line between the container and the at least one nozzle, wherein a first line opening and a second line opening are created, with the first line opening (upstream) leading in the direction of the container, the second line opening (downstream) leading in the direction of the at least one nozzle, connecting the first connecting element to the first line opening and connecting the second connecting element to the second line opening.

The monitoring module according to the invention is designed to interact with a computer system. The computer system is preferably a mobile computer system. A (communicative) connection can be set up between the monitoring module according to the invention and the computer system, via which data are transmitted from the monitoring module to the computer system. A reverse of data from the computer system to the monitoring module is also conceivable. In the latter case, the monitoring module has a receiver for receiving the transmitted data.

It is conceivable that during a period in which the flow meter registers measured values the monitoring module according to the invention and the computer system are permanently connected to one another (e.g. via a Bluetooth connection) and the measured values and/or data derived therefrom are transmitted from the monitoring module to the computer system. However, it is also conceivable that data are transmitted only at defined times and/or when defined events occur. It is conceivable, for example, that the measured values and/or data derived therefrom are stored in a data memory of the monitoring module. It is conceivable that a user initiates a transfer of (stored) data e.g. after completing a spraying process, for example by entering an appropriate command into an input unit of the transfer module and/or the computer system.

A "computer system" is a system for electronic data processing that processes data by means of programmable computation rules. Such a system usually comprises a "computer", the unit that comprises a processor for performing logic operations, and also peripherals.

In computer technology, "peripherals" refers to all devices that are connected to the computer and are used to control the computer and/or as input and output devices. Examples of this are monitors (screens), printers, scanners, mice, keyboards, drives, cameras, microphones, loudspeakers, touch-sensitive displays, etc. Internal connections and expansion cards are also considered peripherals in computer technology.

The term "mobile" is understood as meaning that a user of the computer system can take it along with him. Contemporary computer systems are frequently divided into desktop PCs, portable PCs, laptops, notebooks, netbooks and tablet PCs and so-called handhelds (e.g. smartphones). A mobile computer system is preferably a tablet PC or a handheld computer, particularly preferably a smartphone or a smartwatch.

The inputs into the computer system are made via input means such as a keyboard, a mouse, a microphone, a touch-sensitive display and/or the like. "Input" is also to be understood as meaning the selection of an entry from a virtual menu or from a virtual list or clicking on a checkbox and the like.

Outputs from the computer system usually take place via a screen, a printer, a loudspeaker or by storage on a data memory.

The computer system therefore usually comprises an input unit for inputting data and/or control commands into the computer system and an output unit for outputting data and/or information. The computer system also includes a receiver for receiving data that are transmitted to the computer system, for example via a radio connection. The computer system can further comprise a transmitter that can be used to transmit data from the computer system to the monitoring module and/or to another computer system. The computer system naturally comprises an energy supply that supplies the components of the computer system with electrical energy.

A monitoring module and a (preferably mobile) computer system form a system according to the invention. The system according to the invention can also comprise multiple monitoring module s and/or multiple computer systems and also further components.

In principle, it is conceivable to integrate the functionalities of a system according to the invention into a single device. However, splitting the functionalities over different devices (monitoring module, computer system, and possibly further components) provides a particularly inexpensive solution, since mobile computer systems in the form of smartphones, smartwatches or tablet computers are "ubiquitous". The present disclosure is therefore based on the idea of using as many functions as possible, which a preferably mobile computer system makes available, for and/or monitoring (checking) and/or documenting spraying processes. In a particularly preferred embodiment, therefore, only those components that are usually not made available by a (mobile) computer system are integrated into the monitoring module. These are means for integrating the monitoring module into a line of a sprayer and means for determining the quantities of spray composition which are applied. The quantities of spray composition which are applied are determined by means of the flow meter. Means are also required for transmitting the measured values registered by the flow meter, and/or data derived therefrom, to the computer system in order to use these data for further purposes (performing calculations, linking to further data, displaying, storing and/or the like). However, it is fundamentally conceivable that functions that are usually made available by a (mobile) computer system are provided by the monitoring module.

Components of the system according to the present disclosure can be, for example, a route tracker and a quantity determiner. In some embodiments, the components mentioned can be integrated in a single device or distributed over multiple devices. In some embodiments, they can be part of the monitoring module and/or the computer system on their own or together. However, they can, on their own or together, also be part of separate devices that are independent (of the monitoring module and/or computer system).

In some embodiments, the route tracker is preferably part of the (mobile) computer system. In some embodiments, components of the route tracker may include a GPS sensor and a timer.

The route tracker is configured to track a route. The term "to track a route" means that the route tracker is configured to determine the position by means of a GPS sensor at defined time intervals and/or at defined times and/or when defined events occur (the position of the GPS sensor being determined) and to store the position in a data memory (preferably together with the time at which the position has been determined).

A GPS sensor (GPS=Global Positioning System) is part of a satellite navigation system for position determination. A satellite navigation system is based on satellites which continuously emit their current position and the precise time using encoded radio signals. A receiver (referred to as a GPS sensor in this description) can calculate its own position and speed from the signal transit times. Known satellite navigation systems are, for example, NAVSTAR GPS, GLONASS, Galileo or Beidou. The term "GPS sensor" is not intended to be understood as limiting with regard to the GPS satellite navigation system; it is also intended to include receivers of other satellite navigation systems.

In some embodiments, the route tracker can be used to determine the position of the GPS sensor. If the GPS sensor is carried along with the monitoring module and/or with the sprayer and/or with the mobile computer system, the position of the monitoring module and/or the sprayer and/or the mobile computer system can be determined. During a spraying process, a user moves the sprayer together with the monitoring module (and possibly the mobile computer system) through a target area in which the user sprays an area or one or more target objects with a spray composition. The route which the user covers here can be tracked using the route and recorded (stored in a data memory). In addition, the speeds at which the user moves through the target area can be registered, tracked and recorded.

In some embodiments, the "target area" is the spatial area in which one or more target objects are to be sprayed with one or more spray compositions.

In some embodiments, the "target object" or "target objects" can be one or more plants, one or more areas of a field (e.g. farmland), walls, paths, roads, rails or other objects. In this context, a target area can also comprise target objects which are to be treated with different quantities of a spray composition or with different spray compositions during the application.

In some embodiments, the quantity determiner can be part of the monitoring module or the mobile computer system. In some embodiments, the quantity determiner determines the quantities of spray composition which are applied per unit time using the sprayer. In some embodiments, the quantity determiner receives the measured values from the flow meter and uses them to calculate the quantities of spray composition applied. The quantity determiner can be configured to calculate the application rates of the active substance, contained in the spray composition, per unit area. The calculation is preferably carried out on the basis of the following variables:
spraying width,
concentration of the active substance in the spray composition,
quantities of spray composition which flow through the flow chamber per unit time, and
speeds at which the user moves through the target area.

In some embodiments, the spray width can be input by a user and/or determined empirically in a calibration method, such as that which is described further below. Depending on the configuration, for example when using a bar having multiple nozzles, the spray width may also already be known and stored as a parameter in a data memory.

In some embodiments, the concentration of the active substance in the spray composition can likewise be input by a user. It is also conceivable that the user specifies the product that he uses as spray composition, for example by virtue of his inputting the name of the product or an identifier of the product into the mobile computer system and the computer system then using the product name or the product identifier to determine the concentration of the active substance in the product from a data store. It is further conceivable that the quantity determiner calculates the concentration of the active substance in the spray composition—as described further below for the calibration method.

In some embodiments, the quantities of spray composition which flow through the flow chamber per unit time are measured by the flow meter in the flow chamber of the monitoring module.

The speeds at which the user moves through the target area are determined by the route tracker.

In some embodiments, the quantity determiner can further be configured to combine the information about the respective positions of the GPS sensor (and therefore of the sprayer and of the monitoring module) with the quantities of spray composition which are discharged at the positions per unit time and/or per unit area and/or with the application rates of active substance which are discharged at the positions per unit area, so that for each position the quantity discharged there per unit time/the application rate per unit area is also available.

In some embodiments, the quantity determiner is configured
to receive a spraying width,
to receive speeds along a route,
to receive quantities of spray composition which are/have been applied per unit time along the route, and
to determine quantities of spray composition which are/have been applied per unit area along the route from the received data (spraying width, speeds, quantities of spray composition per unit time).

In some embodiments, the quantity determiner is further configured
to determine a concentration of an active substance in the spray composition, and
to determine application rates of the active substance per unit area along the route.

In some embodiments, a monitoring module is provided, the monitor comprising:
a first connecting element and a second connecting element for integrating the monitoring module into a line of a preferably portable sprayer between a container for spray composition and at least one nozzle, wherein the first connecting element is embodied in such a way that it can be connected to a part of the line of the sprayer which is directed upstream, the second connecting element being embodied in such a way that it can be connected to a part of the line of the sprayer which is directed downstream,
a flow chamber between the first connecting element and the second connecting element,
a flow meter for measuring quantities of spray composition which flow through the flow chamber per unit time, a controller,
a quantity determiner,
a transmitter, and
an energy supply for supplying the flow meter, the controller, the quantity determiner, and the transmitter with electrical energy,
  wherein the controller is configured to receive measured values from the flow meter,
  wherein the controller is configured to cause the quantity determiner to use the received measured values to determine quantities of spray composition which are or have been applied per unit time using the sprayer,
  wherein the controller is configured to cause the transmitter to transmit information about the quantities of spray composition which are or have been applied per unit time using the sprayer to a computer system.

In some embodiments of the present disclosure, a monitoring module is provided, the monitor comprising:
a first connecting element and a second connecting element for integrating the monitoring module into a line of a preferably portable sprayer between a container for spray composition and at least one nozzle, wherein the first connecting element is embodied in such a way that it can be connected to a part of the line of the sprayer which is directed upstream, the second connecting element being embodied in such a way that it can be connected to a part of the line of the sprayer which is directed downstream,
a flow chamber between the first connecting element and the second connecting element,
a flow meter for measuring a quantity of spraying medium which flows through the flow chamber per unit of time,
a controller,
a transmitter,
a route tracker,
a quantity determiner, and
an energy supply for supplying the flow meter, the controller, the transmitter, the route tracker and the quantity determiner with electrical energy,
  wherein the controller is configured to receive measured values from the flow meter,
  wherein the controller is configured to cause the route tracker to track a route,
  wherein the controller is configured to cause the quantity determiner to use the received measured values to determine quantities of spray composition which are or have been applied along the route, and
  wherein the controller is configured to cause the transmitter to transmit information about the route and the quantities of spray composition which are or have been applied along the route to a computer system.

In some embodiments of the present disclosure, a monitoring module is provided, the monitor comprising:
a route tracker with a GPS sensor and a timer, and a quantity determiner,
wherein the route tracker is configured to track a route,
wherein the quantity determiner is configured to determine quantities of spray composition which are or have been applied along the route, and
wherein the controller is configured to cause the transmitter to transmit information about the route and about the quantities of spray composition which are or have been applied along the route to the computer system via a network.

In some embodiments, the system according to the present disclosure comprises:
a monitoring module,
a quantity determiner,
a route tracker, and
a computer system,
  wherein the monitoring module comprises a first connecting element and a second connecting element for integrating the monitoring module into a line of a sprayer between a container for spray composition and at least one nozzle,
  wherein the first connecting element is embodied in such a way that it can be connected to a part of the line of the sprayer which is directed upstream,
  the second connecting element being embodied in such a way that it can be connected to a part of the line of the sprayer which is directed downstream,
  wherein the monitoring module comprises a flow chamber between the first connecting element and the second connecting element,
  wherein the monitoring module comprises a flow meter for measuring a quantity of a spray composition flowing through the flow chamber per unit time,
  wherein the quantity determiner is configured to use measured values of the flow meter to determine quantities of spray composition which are applied per unit time using the sprayer,
  wherein the route tracker is configured to track a route,
  wherein the computer system is configured to display information about the quantities of spray composition which have been applied along the route to a user.

In some embodiments of the present invention, the system may comprise
a monitoring module and
a mobile computer system,
wherein the monitoring module comprises:
a first connecting element and a second connecting element for integrating the monitoring module into a line of a preferably portable sprayer between a container for spray composition and at least one nozzle, wherein the first connecting element is embodied in such a way that it can be connected to a part of the line of the sprayer which is directed upstream, the second connecting element being embodied in such a way that it can be connected to a part of the line of the sprayer which is directed downstream,
a flow chamber between the first connecting element and the second connecting element,
a flow meter for measuring quantities of spray composition which flow through the flow chamber per unit time,
a controller and a transmitter, wherein the controller is configured to receive measured values from the flow meter and to cause the transmitter to transmit data about the quantities of spray composition which flow through the flow chamber per unit time to the computer system, preferably via a short-range radio connection,
an energy supply for supplying the flow meter, the controller and the transmitter with electrical energy,
wherein the computer system comprises:
a receiver, a controller, a quantity determiner, a route tracker and an output unit,
  wherein the controller is configured to cause the receiver to receive the data about the quantities of spray composition which flow through the flow chamber per unit time from the monitoring module, preferably via the short-range radio connection,
  wherein the controller is configured to cause the route tracker to track a route, wherein the controller is configured to cause the quantity determiner to use the received data about the quantities of spray composition which flow through the flow chamber per unit time to determine quantities of spray composition which are applied per unit time using the sprayer along the route, wherein the controller is configured to cause the output unit to display information about the route and about the quantities of spray composition which are or have been applied along the route to a user.

In some embodiments of the present disclosure, the system may comprise a monitoring module and a mobile computer system, wherein the monitoring module comprises:

a first connecting element and a second connecting element for integrating the monitoring module into a line of a preferably portable sprayer between a container for spray composition and at least one nozzle, wherein the first connecting element is embodied in such a way that it can be connected to a part of the line of the sprayer which is directed upstream, the second connecting element being embodied in such a way that it can be connected to a part of the line of the sprayer which is directed downstream, a flow chamber between the first connecting element and the second connecting element, a flow meter for measuring quantities of spray composition which flow through the flow chamber per unit time, a controller, a quantity determiner, a transmitter, and an energy supply for supplying the flow meter, the controller, the quantity determiner, and the transmitter with electrical energy, wherein the controller is configured to receive measured values from the flow meter, wherein the controller is configured to cause the quantity determiner to use the received measured values to determine quantities of spray composition which are or have been applied per unit time using the sprayer, wherein the controller is configured to cause the transmitter to transmit information about the quantities of spray composition which are or have been applied per unit time using the sprayer to the computer system, preferably via a short-range radio connection, wherein the computer system comprises:

a receiver, a controller, a route tracker, and an output unit, wherein the controller is configured to cause the receiver to receive the information about the quantities of spray composition which are or have been applied per unit time using the sprayer, preferably via the short-range radio connection, wherein the controller is configured to cause the route tracker to track a route, wherein the controller is configured to use the received information and the tracked route to determine quantities of spray composition which are or have been applied per unit time using the sprayer along the route, wherein the controller is configured to cause the output unit to display information about the route and about the quantities of spray composition which are or have been applied along the route to a user.

In some embodiments of the present disclosure, the system may comprise a monitoring module and a mobile computer system, wherein the monitoring module comprises:

a first connecting element and a second connecting element for integrating the monitoring module into a line of a preferably portable sprayer between a container for spray composition and at least one nozzle, wherein the first connecting element is embodied in such a way that it can be connected to a part of the line of the sprayer which is directed upstream, the second connecting element being embodied in such a way that it can be connected to a part of the line of the sprayer which is directed downstream, a flow chamber between the first connecting element and the second connecting element, a flow meter for measuring quantities of spray composition which flow through the flow chamber per unit time, a controller, a quantity determiner, a route tracker, a transmitter, and an energy supply for supplying the flow meter, the controller, the quantity determiner, the route tracker, and the transmitter with electrical energy, wherein the controller is configured to receive measured values from the flow meter, wherein the controller is configured to cause the route tracker to track a route, wherein the controller is configured to cause the quantity determiner to use the received measured values to determine quantities of spray composition which are or have been applied per unit time using the sprayer along the route, wherein the controller is configured to cause the transmitter to transmit information about the quantities of spray composition which are or have been applied per unit time using the sprayer to the computer system, preferably via a network, wherein the computer system comprises:

a receiver, a controller and an output unit, wherein the controller is configured to cause the receiver to receive the information about the quantities of spray composition which are or have been applied per unit time using the sprayer along the route, preferably via the network, wherein the controller is configured to cause the output unit to display the information about the quantities of spray composition which are or have been applied along the route to a user.

The network is preferably at least partially a mobile radio network which is used to transmit data according to a mobile radio standard (such as e.g. GSM, GPRS, UMTS, 2G, 3G, LTE, 4G or 5G).

In some embodiments of the present disclosure, the system may comprise a monitoring module and a mobile computer system, wherein the monitoring module comprises a route tracker with a GPS sensor and a timer, a transmitter, and a quantity determiner, wherein the monitoring module comprises a flow meter for measuring a quantity of a spray composition flowing through the flow chamber per unit time, wherein the quantity determiner is configured to use measured values of the flow meter to determine quantities of spray composition which are applied per unit time using the sprayer, wherein the route tracker is configured to track a route, wherein the quantity determiner is configured to transmit information about the route and about the quantities of spray composition which have been applied along the route to the computer system via a network, wherein the computer system is configured to display the route and the information about the quantities of spray composition which have been applied along the route to a user.

In some embodiments of the present disclosure, the system may comprise a monitoring module comprising a controller and a transmitter, a first computer system, which is embodied as a mobile computer system and which comprises a route tracker with a GPS sensor and a timer, a quantity determiner, and a transceiver, a second computer system, wherein the monitoring module comprises a flow meter for measuring a quantity of a spray composition flowing through the flow chamber per unit time, wherein the controller of the monitoring module is configured to receive measured values from the flow meter and to cause the transmitter to transmit data about the quantity of the spray composition which flows through the flow chamber per unit time to the first computer system via a first network, wherein the route tracker is configured to track a route, wherein the route tracker is configured to determine speeds along the route, wherein the quantity determiner is configured to determine the quantities of spray composition and/or the application rates of an active substance contained in the spray composition which have been applied along the route, wherein the first computer system is configured to transmit information about the route and information about the quantities of spray composition and/or application rates of active substance applied along the route to the computer system via a second network, wherein the second computer system is configured to display the route and the information about the quantities of spray composition and/or application rates of active substance applied along the route to a user.

The first network preferably comprises a short-range radio connection between the monitoring module and the first computer system, preferably a Bluetooth, Zigbee or comparable connection.

The second network preferably comprises a long-range mobile radio connection according to a mobile radio standard (such as e.g. GSM, GPRS, UMTS, 2G, 3G, LTE, 4G or 5G).

In some embodiments, the system according to the present disclosure can furthermore comprise a preferably portable sprayer. The sprayer may comprise a container for holding a spray composition, at least one nozzle through which the spray composition exits the sprayer in the direction of a target object, a line between the container and the at least one nozzle and means for conveying the spray composition from the container in the direction of the at least one nozzle (e.g. an electrically or manually operated pump). The preferably portable sprayer can be embodied as a backpack device and in such a case comprises e.g. straps for carrying it on a person's back.

In some embodiments, a method is provided, the method comprising the steps of:

equipping a portable sprayer with a monitoring module, characterized in that the monitoring module is integrated into a line between a container for spray composition and a nozzle of the portable sprayer, so that spray composition which flows from the container to the nozzle flows through a flow chamber of the monitoring module, sensing a route which the portable sprayer covers during a period of time, sensing the quantities of spray composition which flow through the flow chamber along the route, transmitting data about the route covered and about the quantities of spray composition to a computer system via a network, and displaying the route and information about the quantities of spray composition which have been applied along the route to a user.

In some embodiments, the method further comprises the steps of:

receiving a spray width, receiving information about an active substance, sensing a route of a user during a defined period of time, determining speeds of the user along the route, sensing quantities of spray composition which are discharged per unit time along the route by the user, determining application rates of the active substance per unit area along the route on the basis of the speeds of the user, the discharged quantities of spray composition and the information about the active substance, and displaying the route and the application rates of the active substance per unit area along the route.

In some embodiments, calibration can be performed at the start of a spraying process. The calibration is preferably assisted by a computer program which is preferably installed on a mobile computer system, such as for example on a smartphone, and executed there.

The user of the preferably mobile computer system is asked by way of the computer program to cover a defined distance at a constant speed (e.g. a distance of 10 meters to 100 meters) or to move at a constant speed for a defined period of time (e.g. 10 seconds to e.g. 1 minute). During the movement of the user, the user is supposed to apply spray composition or a test liquid (e.g. water) to the ground by means of a sprayer. An average speed at which the user moves is determined by means of a GPS sensor and a timer. The average speed is preferably an arithmetically averaged speed. A flow meter is used to measure an average quantity of spray composition or test liquid which exits at least one nozzle of the portable sprayer per unit time during the movement of the user (according to the invention, the flow rate that flows through the flow chamber of the monitoring module according to the invention is determined; this is the same as the flow rate that passes through the at least one nozzle, however). The average quantity per unit time is preferably the arithmetically averaged quantity per unit time. The average quantity per unit time can be specified, for example, in the form of a mass per unit time (e.g. g/sec) or in the form of a volume per unit time (e.g. L/min).

The calibration values obtained (average speed and average quantity per unit time) can be used to carry out further calculations, perform settings and/or make preparations.

The calibration values obtained can be used, for example, to prepare a spray composition. Many spray compositions are supplied in the form of a concentrate which has to be diluted with a diluent (usually water) according to the manufacturer's instructions before it can be used. In such cases, the degree of dilution itself is often not specified but instead the application rate of active substance per unit area is specified. With respect to an herbicide as the active substance it is thus specified what quantity of the active substance (e.g. in grams or milligrams) is to be discharged per unit area (for example per m2 or per ha) to achieve an (optimum) desired effect. The degree of dilution can be determined using the calibration values specified above, a spraying width and the required application rate. The spraying width can be input into the computer system by the user. The spraying width can be determined by the user, for example, by virtue of his measuring the width of the strip on the ground which is wetted by the spray composition or the test liquid during the calibration. The average quantity of spray composition that is discharged per unit area can be determined from the average quantity that exits the at least one nozzle per unit time and the average speed at which the user moves. The required application rate and the concentration of an active substance in a concentrate can be input into the computer system by the user or read from a database on the basis of a product name or a product identifier. The quantities of concentrate and of diluent which have to be mixed together in order to produce a spray composition which gives rise to the required application rate when applied using the portable sprayer can be determined from the cited variables (required application rate of active substance per unit area, average quantity of discharged spray composition per unit area, concentration of active substance in the present concentrate).

DETAILED DESCRIPTION OF EXEMPLARY EMBODIMENTS

The invention is explained in more detail below with reference to figures, without wishing to restrict the invention to the features and combinations of features that are shown in the figures.

Figure 1:
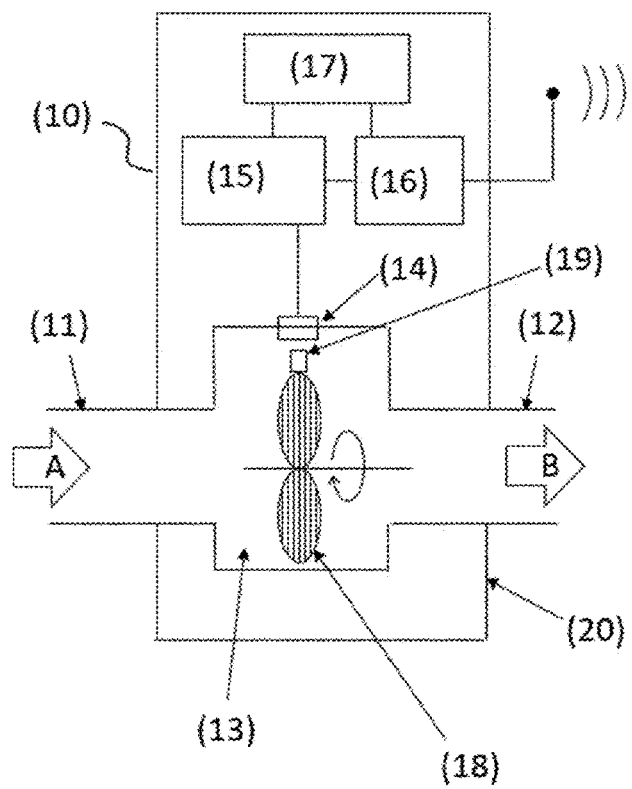
FIG. 1 schematically shows a monitor, according to some embodiments.

FIG. 1 schematically shows an embodiment of the monitoring module according to the invention. The monitoring module (10) comprises a first connecting element (11) and a second connecting element (12) for integrating the monitoring module into a line of the sprayer between a container for spray composition and at least one nozzle. The monitoring module (10) further comprises a flow chamber (13) between the first connecting element and the second connecting element. The arrows A and B indicate the direction of flow of a spray composition which flows from the container of the sprayer through the flow chamber (13) in the direction of the at least one nozzle. Arrow A denotes the direction of flow of the spray composition which comes from the direction of the container and enters the flow chamber (13); arrow B denotes the direction of flow of the spray composition which leaves the flow chamber (13) again in the direction of the at least one nozzle. In the nozzle there is an impeller (18) which is set in rotation by the spray composition which flows through the flow chamber (13). A permanent magnet (19) is attached to the impeller (18). The permanent magnet (19) moves past a Hall sensor (14) when the impeller (18) rotates. The Hall sensor (14) is used as a pulse counter. The pulses are forwarded to a controller (15). The impeller (18), the permanent magnet (19) and the Hall sensor (14) together form a flow sensor. The controller (15) determines the speed of the impeller from the pulses per unit time and the flow rate of the spray composition from the speed of the impeller. The flow rate of the spray composition can be transmitted to a (separate) computer system by way of a transmitter (16). An energy supply (17) is used to supply the flow meter (14, 18, 19), the controller (15) and the transmitter (16) with electrical energy. All components of the monitoring module (10) are attached to a housing (20) or accommodated in the housing (20).

Figure 2A:
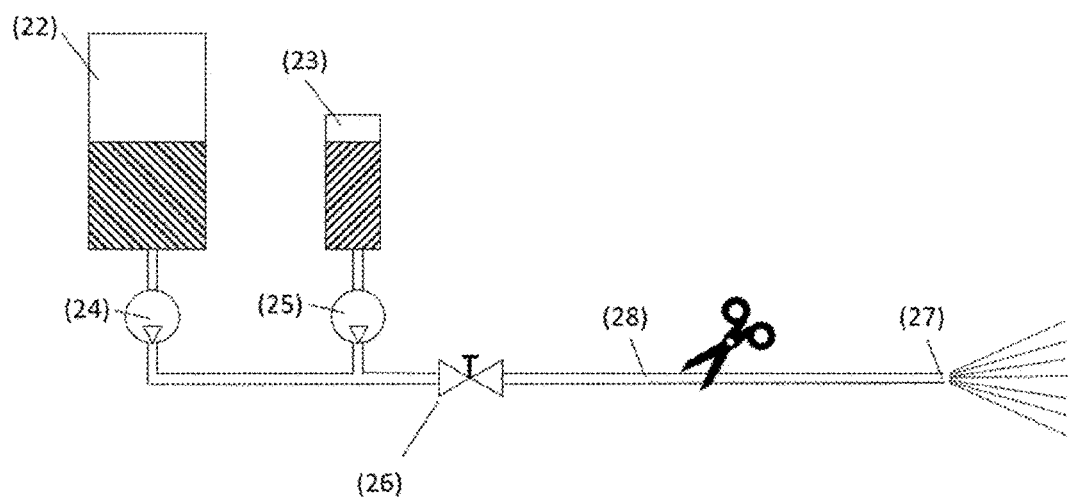
FIG. 2a schematically shows that a line of a sprayer, according to some embodiments.
Figure 2B:
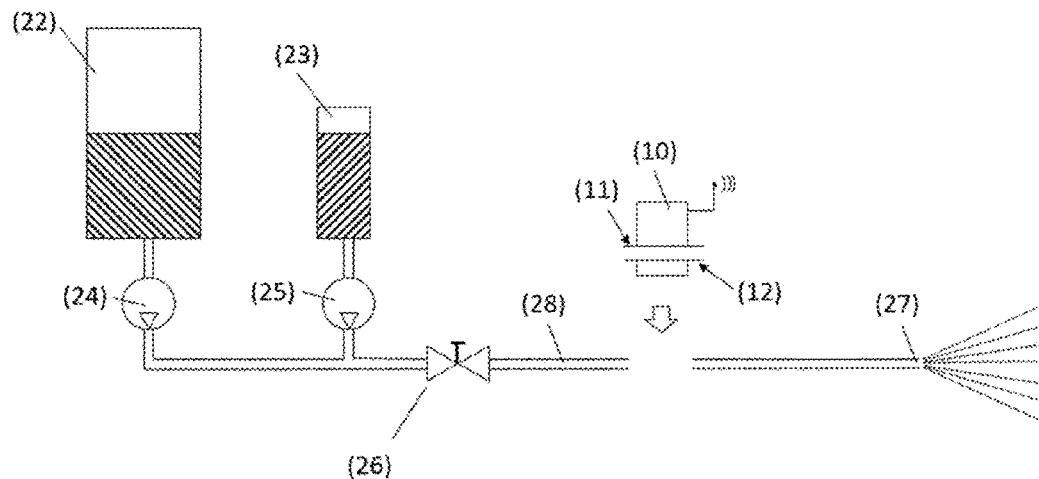
FIG. 2b shows that a sprayer line which has been cut, according to some embodiments.
Figure 2C:
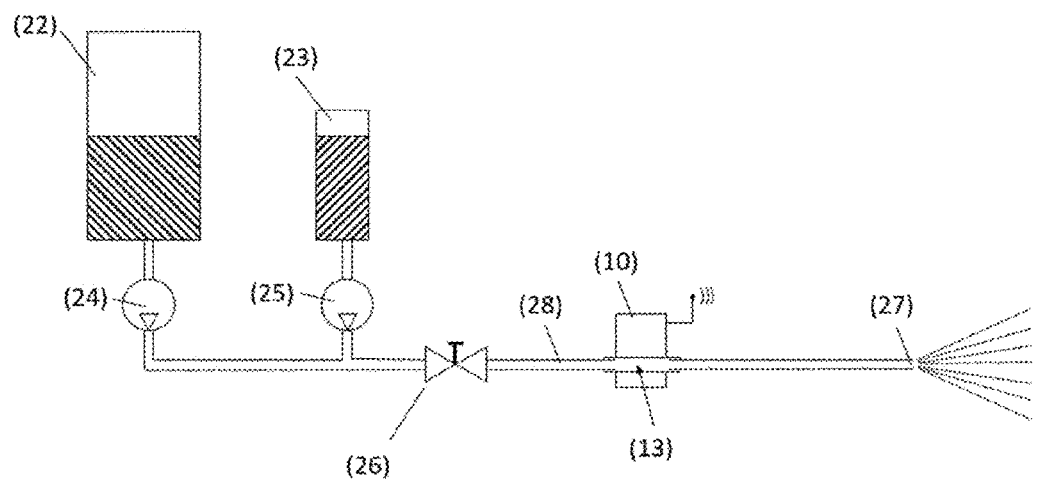
FIG. 2c shows a monitor integrated with a line of a sprayer, according to some embodiments.

FIGS. 2a to 2c schematically show how a monitoring module according to the invention can be integrated into a line of a sprayer. FIG. 2a shows the sprayer. The sprayer comprises a first container (22) containing a first liquid and a second container (23) containing a second liquid. The second liquid can be an active substance concentrate, for example, and the active substance can be a pesticide. The first liquid can be a diluent for the active substance concentrate, for example can be water.

The first liquid is conveyed out of the first container (22) in the direction of at least one nozzle (27) via a first conveying means (24), such as, for example, an electrically driven pump. The second liquid is conveyed out of the second container (23) in the direction of at least one nozzle (27) via a second conveying means (25), such as, for example, an electrically driven pump. The liquids mix on their way through the line (28). A mixture of the first and second liquids exits the at least one nozzle (27). A shutoff valve (26) can be used to stop the flow.

FIG. 2a schematically shows that the line (28) between the containers (22, 23) and the at least one nozzle (27) is cut at one point (indicated by the scissors). FIG. 2b shows that the line (28) between the containers (22, 23) and the at least one nozzle (27) has been cut. The fluid connection between the containers (22, 23) and the at least one nozzle (27) is broken. The monitoring module (10) according to the invention is integrated at the location of the break. For this purpose, the monitoring module (10) has a first connecting element (11) and a second connecting element (12). The first connecting element (11) is connected to that part of the line (28) which leads upstream in the direction of the containers (22, 23). The second connecting element (12) is connected to that part of the line (28) which leads downstream in the direction of the at least one nozzle (27). FIG. 2c shows the monitoring module (10) integrated in the line (28). The fluid connection between the containers (22, 23) and the at least one nozzle (27) is restored by the monitoring module (10). Liquid which flows out of the containers (22, 23) in the direction of the at least one nozzle (27) flows through a flow chamber (13) of the monitoring module.

Figure 3:
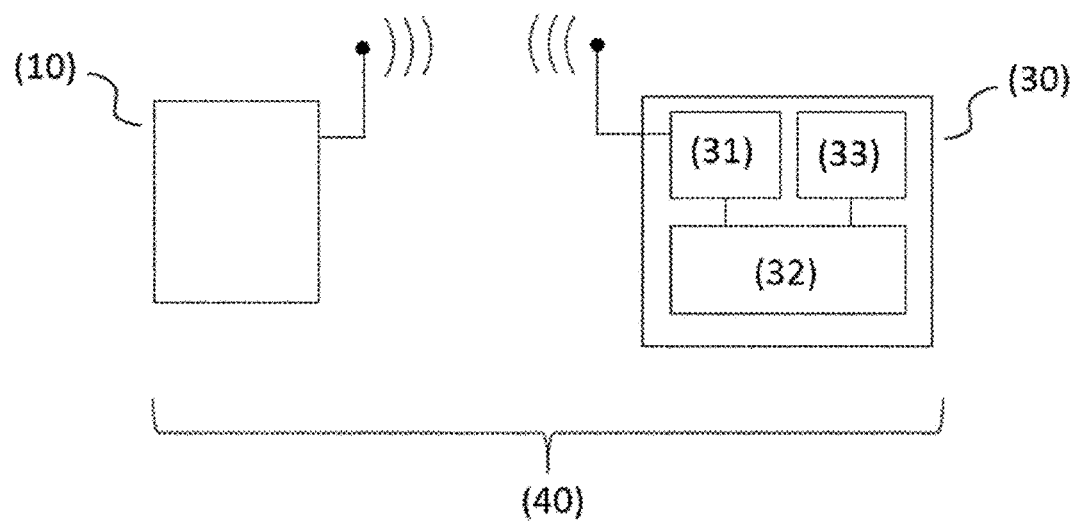
FIG. 3 schematically shows a system, according to some embodiments.

FIG. 3 schematically shows an embodiment of a system according to the invention. The system (40) comprises a monitoring module (10) and a computer system (30). The monitoring module (10) can be, for example, the monitoring module shown in FIG. 1. The monitoring module is configured to transmit data about the quantity of a spray composition which flows through a flow chamber of the monitoring module per unit time to the computer system (30). The computer system (30) comprises a receiver (31), a controller (32) and an output unit (33). The controller (32) is configured to cause the receiver (31) to receive the data transmitted by the monitoring module (10). The controller (32) is further configured to cause the output unit (33) to display the data to a user.

Figure 4:
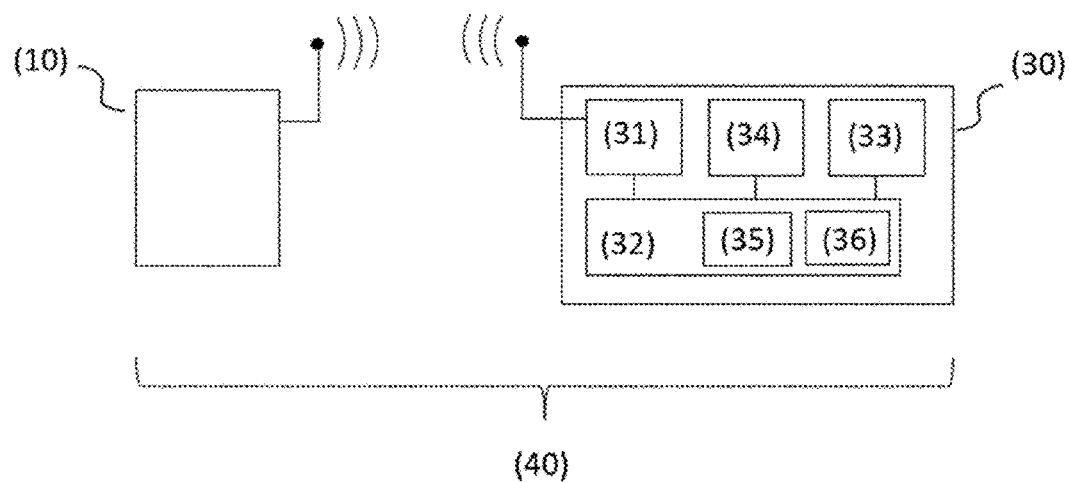
FIG. 4 schematically shows a system, according to some embodiments.

FIG. 4 schematically shows a further embodiment of the system according to the invention. The system (40) comprises a monitoring module (10) and a computer system (30). The monitoring module (10) is configured to measure quantities of spray composition which flow through a flow chamber (not explicitly shown) of the monitoring module (10) per unit time and to transmit data about these quantities to the computer system (30) by way of a transmitter (not explicitly shown) of the monitoring module. The computer system (30) comprises a receiver (31), a controller (32), a quantity determiner (36), a route tracker (35) with a GPS sensor (34) and an output unit (33). The quantity determiner (36) and the route tracker (35) can be part of the controller (32). The controller (30) is configured to cause the receiver (31) to receive the data about the quantities of spray composition which flow through the flow chamber per unit time from the monitoring module (10). The controller (32) is further configured to cause the route tracker (35) to track the route along which the computer system (30) (or the GPS sensor (34) as part of the computer system (40)) is moved. The controller (32) is further configured to cause the quantity determiner (36) to use the data transmitted by the monitoring module (10) to determine quantities of spray composition which are applied per unit time using the sprayer along the route. The controller (32) is further configured to cause the output unit (33) to display information about the route and about the quantities of spray composition which are or have been applied along the route to a user.

FIGS. 5 to 8 show screenshots of a mobile computer system for assisting a spraying process and for checking, tracking and documenting the spraying process.

Figure 5:
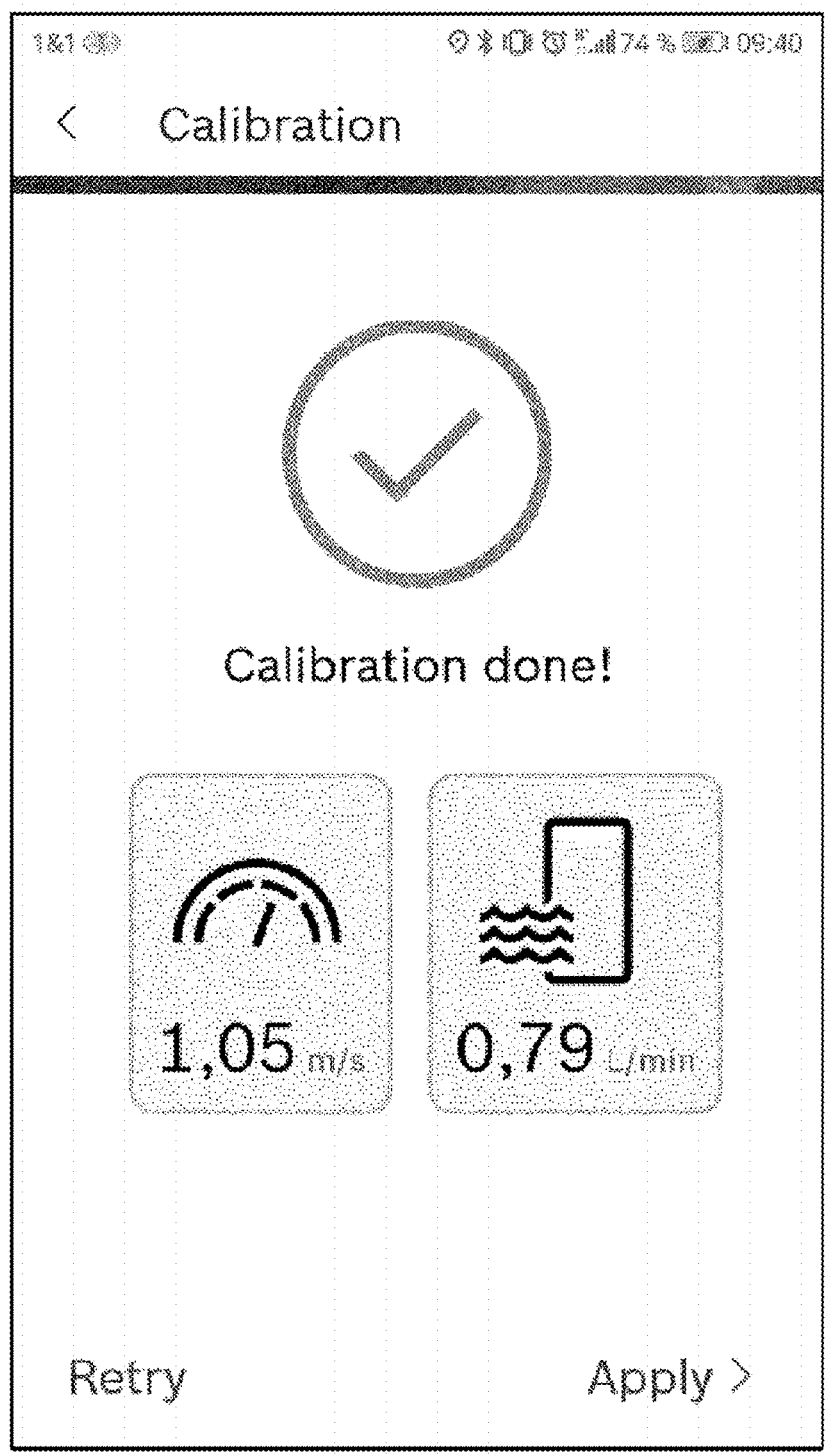
FIG. 5 shows a display of a successful completion of a calibration method which is assisted by a computer program on the mobile computer system, according to some embodiments.

FIG. 5 shows the successful completion of a calibration method which is assisted by a computer program on the mobile computer system. The values determined can be presented to the user as shown. The data are stored in the system and are used to check compliance with the spray parameters later on.

Figure 6:
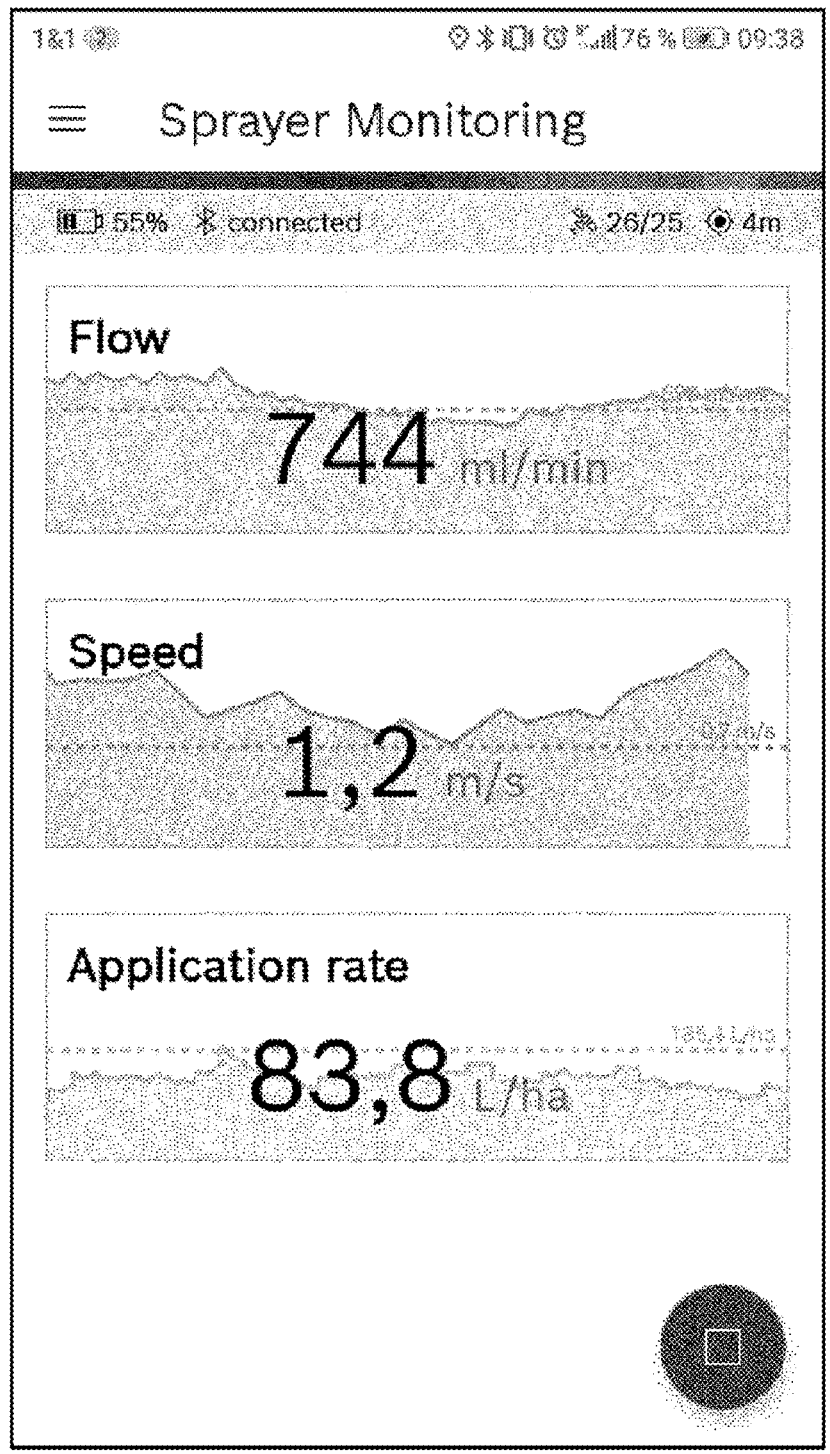
FIG. 6 shows displays of a computer program during a spraying process, according to some embodiments.

FIG. 6 shows displays of the computer program during a spraying process. The average quantity of spray composition which flows through the flow chamber per unit time is shown at the top as a function of time. The dashed line indicates the guideline value, determined during calibration, which the user should adhere to in order to achieve an optimum spraying result. The speed at which the user moves through the target area is shown in the middle as a function of time. The dashed line indicates the guideline speed at which the user should move in order to achieve an optimum spraying result. The application rate per unit area is shown at the bottom as a function of time. The dashed line indicates the guideline value which should be attained in order to achieve an optimum spraying result.

Figure 7:
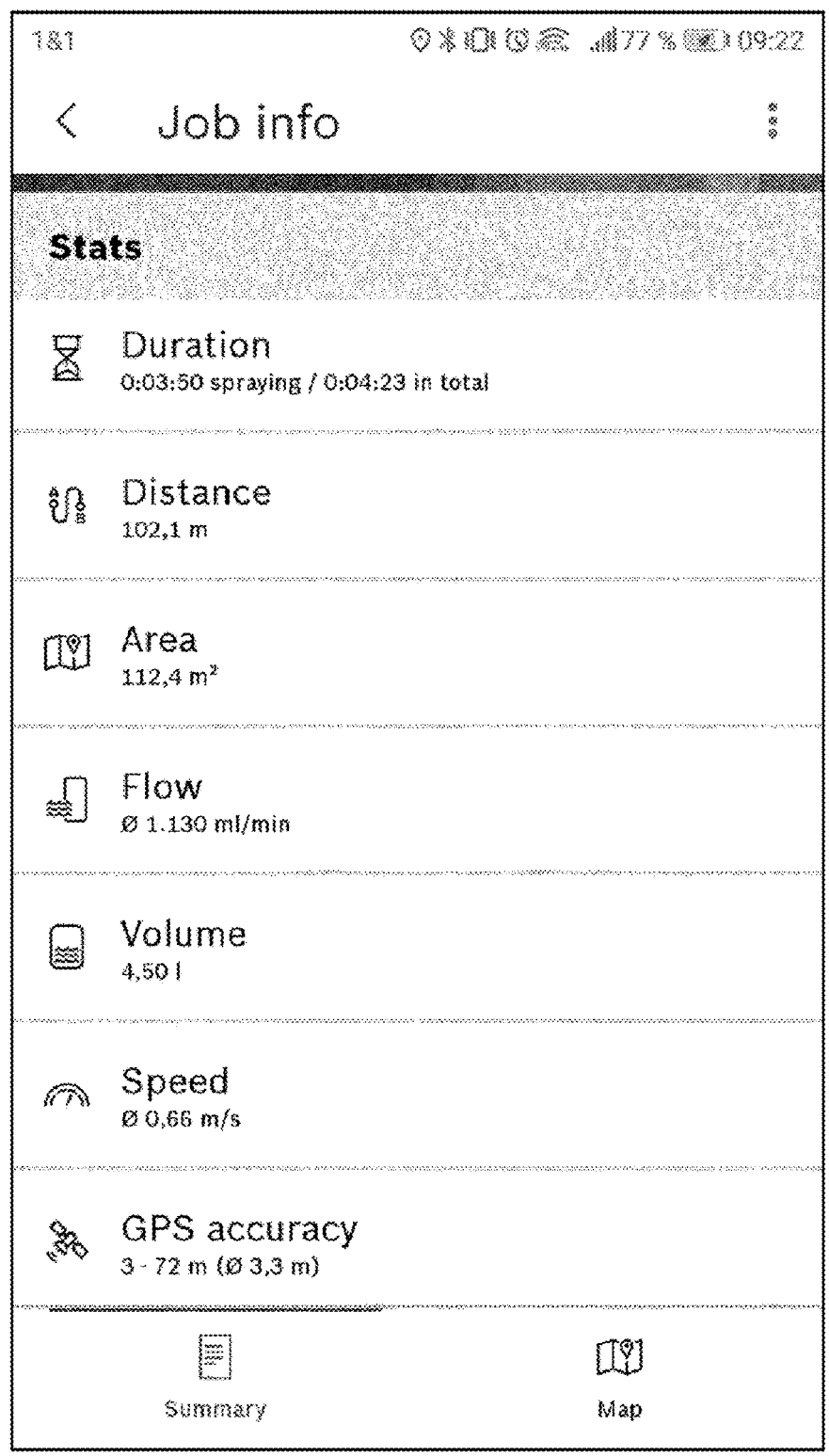
FIG. 7 shows a display of a summary of variables after a spraying process, according to some embodiments.

FIG. 7 displays a summary of variables after a spraying process. It shows how long the spraying process lasted (Duration), what distance the user covered (Distance), what area he sprayed (Area), how high the arithmetically averaged flow rate was (Flow), what volume of spray composition has been sprayed (Volume), how high the arithmetically averaged speed of the user was (Speed) and what the accuracy of the position is (GPS accuracy). In addition, the data of a calibration carried out previously and parameters input at the beginning of the spraying process (for example area description, culture) are displayed.

Figure 8:
FIG. 8 shows a path which has been covered by a user on a map, according to some embodiments.

FIG. 8 shows the path which has been covered by a user on a map. The width of the strip denotes the spraying width. The grayscales can indicate various parameters depending on the setting: the speed of the user, the application rate, the flow rate and the like.

Figure 9:
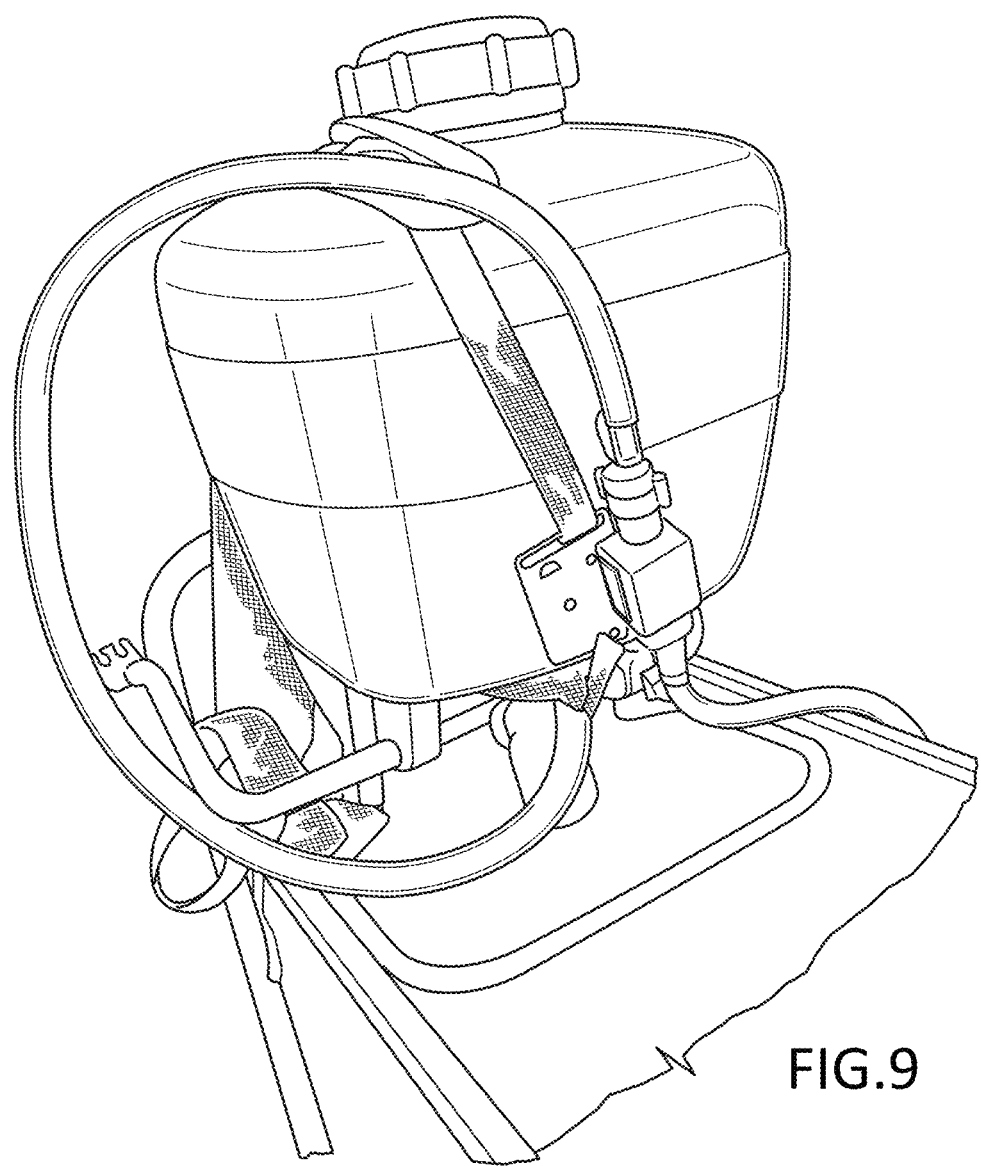
FIG. 9 illustrates a monitor introduced into a line of a portable sprayer, according to some embodiments.

FIG. 9 illustrates a monitoring module introduced into a line of a portable sprayer.

The invention claimed is:

1. A monitoring module for equipping a portable sprayer with functions for monitoring a spraying process, wherein the monitoring module comprises:
   a housing; and
   a first connecting element and a second connecting element attached to the housing for integrating the monitoring module into a line of the portable sprayer between a concentrate container and at least one nozzle, wherein the first connecting element is configured to be connected to a part of the line of the portable sprayer which is directed upstream away from the at least one nozzle, wherein the part of the line which is directed upstream is fluidly connected to:
   a diluent container upstream of the concentrate container,
   a first pump downstream of the diluent container and upstream of the concentrate container,
   the concentrate container,
   a second pump downstream of the concentrate container, and
   a shutoff valve downstream of the second pump,
   wherein the second connecting element is configured to be connected to a part of the line of the portable sprayer which is directed downstream toward the at least one nozzle, and wherein the housing comprises:
   a flow chamber between the first connecting element and the second connecting element,
   a flow meter in the flow chamber for measuring a quantity of a spray composition comprising a diluent from the diluent container and a concentrate from the concentrate container which flows through the flow chamber per unit of time,
   a controller outside the flow chamber,
   a transmitter outside the flow chamber, and
   an energy supply outside the flow chamber for supplying the flow meter, the controller, and the transmitter with electrical energy,
   wherein the controller is configured to receive measured values from the flow meter and to cause the transmitter to transmit data about the quantity of the spray composition which flows through the flow chamber per unit time to a computer system.

2. The monitoring module of claim 1, further comprising a quantity determiner, wherein the controller is configured to cause the quantity determiner to use the measured values of the flow meter to determine quantities of the spray composition which are or have been applied by means of the portable sprayer, and wherein the controller is configured to cause the transmitter to transmit data about the quantities which are or have been applied by means of the portable sprayer to the computer system.

3. The monitoring module of claim 1, further comprising a route tracker with a GPS sensor and a timer, and a quantity determiner, wherein the route tracker is configured to track a route, wherein the quantity determiner is configured to determine quantities of the spray composition which are or have been applied along the route, and wherein the controller is configured to cause the transmitter to transmit data about the route and about the quantities of the spray composition which are or have been applied along the route to the computer system via a network.

4. The monitoring module of claim 1, wherein the transmitter is configured to transmit the data to the computer system via a short-range radio connection.

5. The monitoring module of claim 1, wherein the transmitter is configured to transmit the data to the computer system via a long-range mobile radio connection.

6. A system comprising:
a monitoring module, and
a computer system,
wherein the monitoring module comprises:
  a housing; and
  a first connecting element and a second connecting element attached to the housing for integrating the monitoring module into a line of a portable sprayer between a concentrate container and at least one nozzle, wherein the first connecting element is configured to be connected to a part of the line of the portable sprayer which is directed upstream away from the at least one nozzle, wherein the part of the line which is directed upstream is fluidly connected to:
  a diluent container upstream of the concentrate container,
  a first pump downstream of the diluent container and upstream of the concentrate container,
  the concentrate container,
  a second pump downstream of the concentrate container, and
  a shutoff valve downstream of the second pump,
  wherein the second connecting element is configured to be connected to a part of the line of the portable sprayer which is directed downstream toward the at least one nozzle, and
  wherein the housing comprises:
    a flow chamber between the first connecting element and the second connecting element,
    a flow meter in the flow chamber for measuring a quantity of a spray composition comprising a diluent from the diluent container and a concentrate from the concentrate container which flows through the flow chamber per unit of time,
    a transmitter outside the flow chamber,
    a controller outside the flow chamber, wherein the controller is configured to receive measured values from the flow meter and to cause the transmitter to transmit data about the quantity of the spray composition which flows through the flow chamber per unit time to the computer system, and
    an energy supply outside the flow chamber for supplying the flow meter, the controller, and the transmitter with electrical energy, and
  wherein the computer system is configured to receive the data from the monitoring module and to display said data to a user.

7. The system of claim 6, wherein the computer system is a mobile computer system comprising a route tracker with a GPS sensor and a timer, a quantity determiner, and a transceiver, wherein the route tracker is configured to track a route, wherein the route tracker is configured to determine speeds along the route, wherein the quantity determiner is configured to determine the quantities of the spray composition and/or the application rates of an active substance contained in the spray composition which have been applied along the route, and wherein the computer system is configured to display the route and the information about the quantities of the spray composition and/or application rates of active substance applied along the route to the user.

8. The system of claim 7, wherein the quantity determiner is configured to:
receive a spraying width,
receive speeds along the route,
receive quantities of the spray composition which are/have been applied per unit time along the route, and
determine, based on the spraying width, the speeds, and the quantities of the spray composition per unit time, quantities of the spray composition which are/have been applied per unit area along the route.

9. The system of claim 8, wherein the quantity determiner is further configured to determine a concentration of an active substance in the spray composition, to determine application rates of the active substance per unit area along the route.

10. A method comprising:
equipping a portable sprayer with a monitoring module, wherein the monitoring module comprises:
  a housing; and
  a first connecting element and a second connecting element attached to the housing for integrating the monitoring module into a line of the portable sprayer between a concentrate container and at least one nozzle, wherein the first connecting element is configured to be connected to a part of the line of the portable sprayer which is directed upstream away from the at least one nozzle, wherein the part of the line which is directed upstream is fluidly connected to:
  a diluent container upstream of the concentrate container,
  a first pump downstream of the diluent container and upstream of the concentrate container,
  the concentrate container,
  a second pump downstream of the concentrate container, and
  a shutoff valve downstream of the second pump,
  wherein the second connecting element is configured to be connected to a part of the line of the portable sprayer which is directed downstream toward the at least one nozzle, and
  wherein the housing comprises:
    a flow chamber between the first connecting element and the second connecting element, a flow meter in the flow chamber for measuring a quantity of a spray composition comprising a diluent from the diluent container and a concentrate from the concentrate container which flows through the flow chamber per unit of time, a transmitter outside the flow chamber, a controller outside the flow chamber, wherein the controller is configured to receive measured values from the flow meter and to cause the transmitter to transmit data about the quantity of the spray composition which flows through the flow chamber per unit time to the computer system, and an energy supply outside the flow chamber for supplying the flow meter, the controller, and the transmitter with electrical energy, sensing a route which the portable sprayer covers during a period of time, sensing the quantities of spray composition which flow through the flow chamber along the route, transmitting data about the route covered and about the quantities of spray composition to a computer system via a network, and displaying the route and information about the quantities of spray composition which have been applied along the route to a user.

11. The method of claim 10, further comprising:

receiving a spray width, receiving information about an active substance, sensing the route of the user during the defined period of time, determining speeds of the user along the route, sensing quantities of the spray composition which are discharged per unit time along the route by the user, determining application rates of an active substance contained in the spray composition per unit area along the route based on the speeds of the user, the discharged quantities of spray composition and the information about the active substance, and displaying the route and the application rates of the active substance per unit area along the route.

* * * * *